United States Patent
Persad et al.

(10) Patent No.: US 7,021,716 B2
(45) Date of Patent: Apr. 4, 2006

(54) TIP EASY ENTRY AND FOLD FLAT RECLINER ASSEMBLY

(75) Inventors: Rabindranath Persad, Brighton, MI (US); Rommel Diones, Sterling Heights, MI (US); Stephen P. Tokarz, New Boston, MI (US); Ashok K. Sahi, West Bloomfield, MI (US)

(73) Assignee: Intier Automotive Inc., Aurora (CA)

( * ) Notice: Subject to any disclaimer, the term of this patent is extended or adjusted under 35 U.S.C. 154(b) by 0 days.

(21) Appl. No.: 10/483,029

(22) PCT Filed: Jul. 8, 2002

(86) PCT No.: PCT/US02/21622

§ 371 (c)(1),
(2), (4) Date: Jun. 30, 2004

(87) PCT Pub. No.: WO03/004307

PCT Pub. Date: Jan. 16, 2003

(65) Prior Publication Data

US 2004/0239168 A1     Dec. 2, 2004

Related U.S. Application Data

(60) Provisional application No. 60/303,725, filed on Jul. 6, 2001.

(51) Int. Cl.
*B60N 2/02* (2006.01)

(52) U.S. Cl. ................................. 297/378.12
(58) Field of Classification Search ........... 297/378.12, 297/341, 340
See application file for complete search history.

(56) References Cited

U.S. PATENT DOCUMENTS

| | | | |
|---|---|---|---|
| 3,953,069 A | 4/1976 | Tamura et al. | |
| 4,076,309 A | 2/1978 | Chekirda et al. | |
| 4,146,267 A | * | 3/1979 | Mori et al. ................. 297/367 |
| 4,286,819 A | 9/1981 | Inoue et al. | |
| 4,627,656 A | 12/1986 | Gokimoto et al. | |
| 4,997,223 A | 3/1991 | Croft | |
| 5,224,759 A | 7/1993 | Matsuura et al. | |

(Continued)

FOREIGN PATENT DOCUMENTS

FR     2 391 873 A     12/1978

(Continued)

*Primary Examiner*—Peter M. Cuomo
*Assistant Examiner*—Sarah B. McPartlin
(74) *Attorney, Agent, or Firm*—Clark Hill PLC

(57) ABSTRACT

The seat assembly comprises a seat cushion (12) and a seat back (14). A recliner assembly (16) operatively interconnects the seat cushion and the seat back for selective locking and adjustment of the seat back between a plurality of reclined seating positions (B) and a stowed position (D). A stop (40) is pivotally mounted to the seat cushion for movement between first and second positions. The stop includes a hook (44) presented for engagement with the seat back when the stop is in the second position for maintaining the seat back in a tilted position (G) between the plurality of reclined seating positions (B) and the stowed position (D). When the stop (40) is in the first position, the seat back may be adjusted between the plurality of reclined seating positions (B. A track assembly (18) extends between the seat assembly and the vehicle for selective locking and adjustment of the seat assembly within vehicle between a plurality of fore and aft seating positions (E) and an easy entry position (F) forward of the seating positions (E). The stop (46) is operatively interconnected (48) to the track assembly (18) for locking and unlocking the track assembly during rotation of the stop (40) between the first and second positions, respectively.

14 Claims, 5 Drawing Sheets

U.S. PATENT DOCUMENTS

| | | | |
|---|---|---|---|
| 5,383,710 A * | 1/1995 | Premji | 297/378.12 |
| 5,522,643 A | 6/1996 | Matsuura | |
| 5,597,206 A * | 1/1997 | Ainsworth et al. | 297/378.12 |
| 5,788,330 A | 8/1998 | Ryan | |
| 5,820,218 A | 10/1998 | Baloche et al. | |
| 6,139,104 A | 10/2000 | Brewer | |
| 6,139,105 A | 10/2000 | Morgos et al. | |
| 6,199,953 B1 | 3/2001 | Chen | |
| 6,209,955 B1 | 4/2001 | Seibold | |
| 6,312,053 B1 | 11/2001 | Magyar | |
| 6,550,864 B1 * | 4/2003 | Zarna et al. | 297/378.12 |
| 6,659,557 B1 * | 12/2003 | Deptolla | 297/367 |
| 6,739,668 B1 * | 5/2004 | Coman et al. | 297/378.12 |
| 2001/0040400 A1 | 11/2001 | Kamida et al. | |
| 2002/0040400 A1 * | 4/2002 | Masters | 709/228 |
| 2002/0135216 A1 * | 9/2002 | Hamelin et al. | 297/378.12 |
| 2004/0090102 A1 * | 5/2004 | Tame et al. | 297/378.12 |

FOREIGN PATENT DOCUMENTS

| | | |
|---|---|---|
| WO | WO 98 45136 A | 10/1998 |
| WO | WO 99 38723 A | 8/1999 |
| WO | WO 00 27668 A | 5/2000 |

* cited by examiner

TIP EASY ENTRY AND FOLD FLAT RECLINER ASSEMBLY

This application claims the benefit of provisional application No. 60/303,725 filed Jul. 6, 2001.

FIELD OF THE INVENTION

The subject invention relates to a vehicle seat assembly having a seat cushion and a seat back operatively interconnected to the seat cushion for pivotal adjustment between a plurality of reclined seating positions and a stowed position, and more particularly, to a mechanism that holds the seat back in a tilted position intermediate of the reclined seating positions and the stowed position to facilitate access or ingress behind the seat assembly.

BRIEF DESCRIPTION OF THE RELATED ART

An automotive vehicle includes seat assemblies for supporting occupants within the vehicle above a floor. Typically, a seat assembly includes a seat cushion, a seat back and a recliner assembly operatively coupled between the seat back and the seat cushion. The recliner assembly allows pivotal adjustment of the seat back between a plurality of reclined seating positions, therebetween. A track assembly interconnects the seat cushion to the floor and allows selective locking and adjustment of the seat assembly between a range of fore and aft seating positions along the floor. Further, it is common for the track assembly and the recliner assembly to be synchronized or linked together to allow the seat assembly to be adjusted to an easy entry position. In the easy entry position, the entire seat assembly is positioned forward of the range of seating positions and the seat back is tilted forwardly to facilitate access or ingress behind the seat assembly.

Often it is desired to have the seat back fold flat against the seat cushion to increase the cargo carrying capacity of the vehicle. However, conventional seat assemblies that are adjustable to an easy entry position do not additionally provide for a seat back that can be folded flat against the seat cushion. Allowing a seat back to merely fold flat while adjusting the entire seat forward to an easy entry position along the track assembly would likely present packaging interferences with the seat back and obstructions typically found in front of a seat assembly, such as a dashboard or another seat assembly.

Accordingly, there remains a need for a seat assembly having a mechanism for maintaining the seat back in a forwardly tilted position while the seat assembly is adjusted to the easy entry position, and further allows the seat back to be adjusted to a folded flat position against the seat cushion.

SUMMARY OF THE INVENTION

According to one aspect of the invention, a seat assembly for an automotive vehicle is provided comprising a seat cushion and a seat back. A recliner assembly is operatively coupled between the seat cushion and the seat back for selective locking and pivotal adjustment of the seat back between a plurality of reclined seating positions and a stowed position overlying the seat cushion. A release lever is pivotally coupled to the seat assembly for movement between an unreleased position and a released position for locking and unlocking the recliner assembly, respectively. A stop hookingly engagable with the seat back for maintaining the seat back in a tilted position between the plurality of reclined seating positions and the stowed position is pivotally coupled to the seat assembly for movement between a first position wherein the seat back is movable between the plurality of reclined seating positions and the stowed position and a second position presented for engaging the seat back for maintaining the seat back in the tilted position. A dump lever is cammingly engaged with the release lever and the stop and is pivotally coupled to the seat assembly for movement between unreleased and released positions for moving the release lever between the respective unreleased and released positions and simultaneously moving the stop between the first and second positions.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
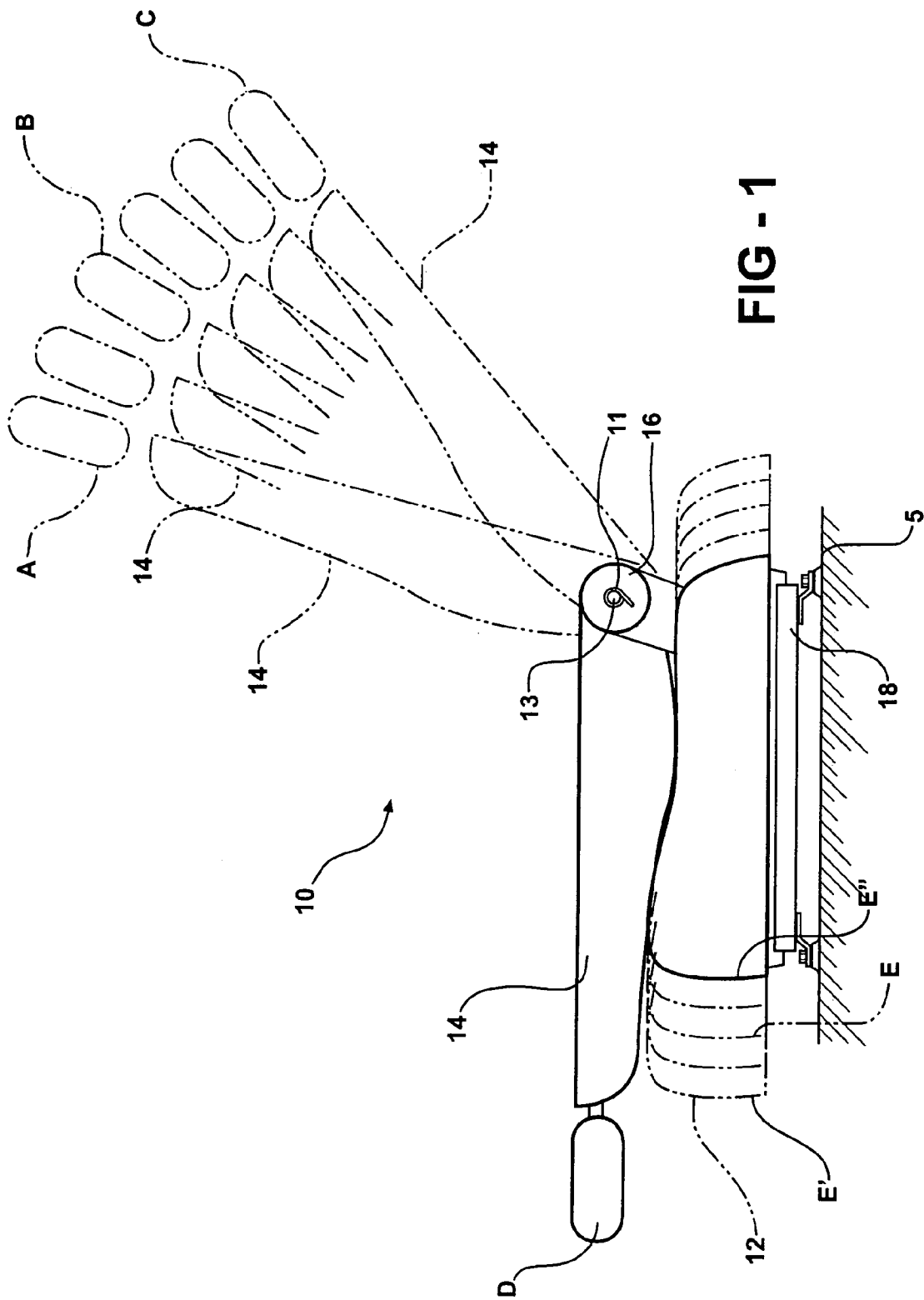
FIG. 1 is a side view of a seat assembly incorporating one aspect of the invention.
Figure 2:
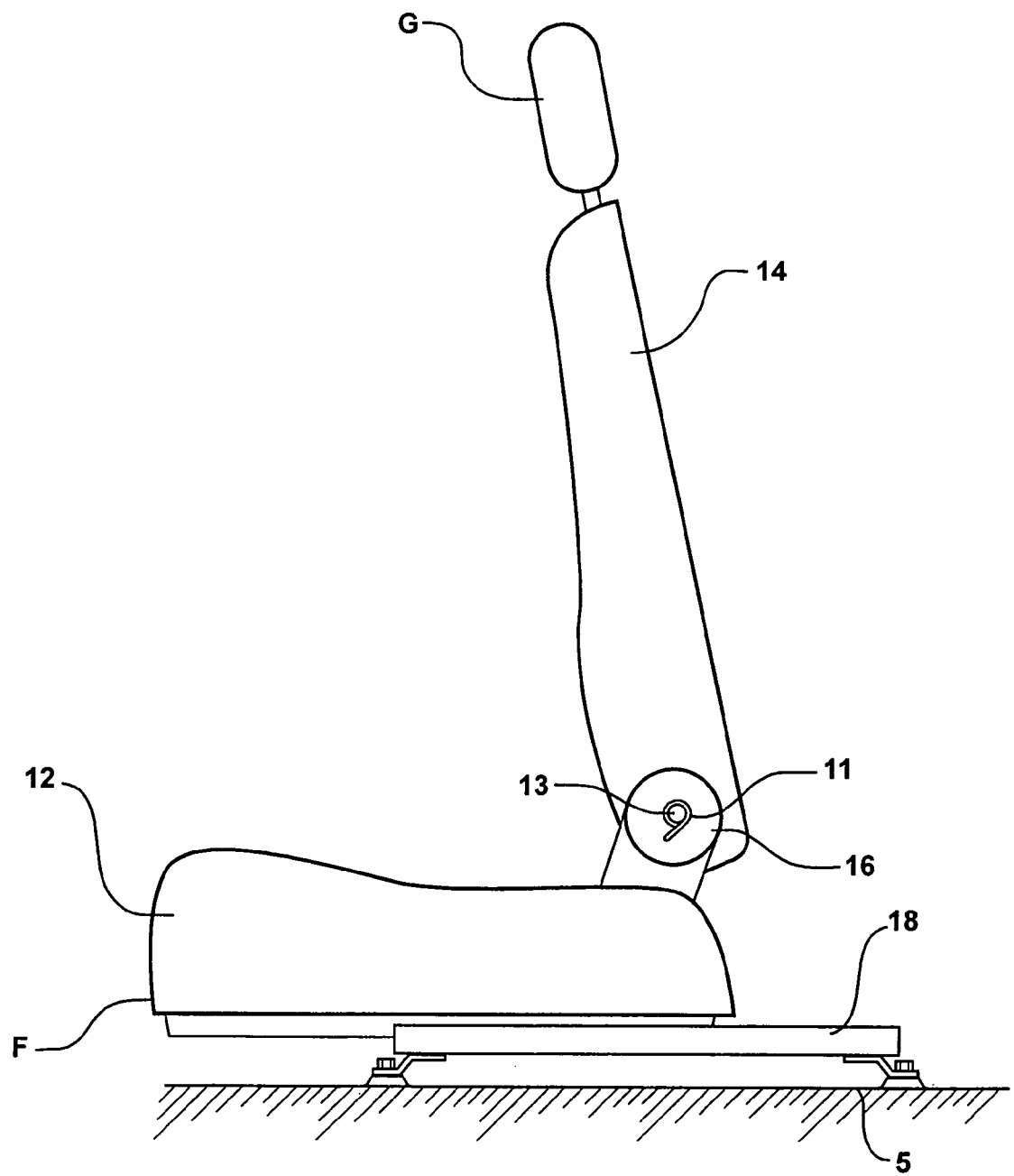
FIG. 2 is a side view of the seat assembly in an easy entry position with the seat back in the tilted position.

Referring to the figures, FIGS. 1 and 2 show a seat assembly 10 for supporting an occupant above a vehicle floor 8. The seat assembly 10 comprises a seat cushion 12 and a seat back 14. A recliner assembly 16 is operatively coupled between the seat back 14 and the seat cushion 12 for providing selective angular adjustment of the seat back 14 relative to the seat cushion 12 about a pivot axis 13. More specifically, the recliner assembly 16 allows the seat back 14 to be adjusted between a substantially upright seating position A, a fully reclined seating position C, and a plurality of reclined seating positions B therebetween. The recliner assembly 16 also allows the seat back 14 to be adjusted between one of the seating positions and a generally horizontal, stowed position D. Preferably, the seat back 14 is biased towards the stowed position D by any suitable biasing member 11, such as a clock spring or a torsion spring, extending between the seat cushion 12 and the seat back 14. The recliner assembly 16 may be actuated between locked and unlocked states. In the locked state, the recliner assembly 16 maintains the angular position of the seat back 14 relative to the seat cushion 12. In the unlocked state, the seat back 14 may be freely adjusted between the plurality of reclined seating positions A, B, C and the stowed position D. The recliner assembly 16 is biased in the locked state by any suitable means, such as a clock spring. Further detail of the structure and function of such a recliner assembly is fully disclosed in applicant's U.S. Pat. No. 6,312,053 issued on Nov. 6, 2001, which is incorporated herein by reference in its entirety.

A track assembly 18, as commonly known by those skilled in the seating art, is disposed between the seat cushion 12 and the vehicle floor 5. The track assembly 18 allows incremental, fore and aft adjustment of the seat assembly 10 relative to the vehicle floor 8. The track assembly 18 includes a locking mechanism for releasably locking the seat assembly 10 in one of a plurality of seating positions B bounded by a full forward seating position E' and a full rear seat position E". The track assembly 18 further allows the seat assembly 10 to be adjusted from one of the seating positions E to an extended position beyond the full forward position E', commonly referred to as an "easy entry" position F, as shown in FIG. 2. The easy entry position F facilitates access or ingress behind the seat assembly 10. Further detail of the structure and function of such a track assembly is fully disclosed in applicant's co-pending PCT Patent Application PCT/CA01/01152 filed on Aug. 14, 2001, which is incorporated herein by reference in its entirety. Discussed in detail below, the seat assembly 10 includes a mechanism for maintaining the seat back 14 in a forwardly tilted position G during adjustment of the seat assembly 10 to the easy entry position F.

Figure 3:
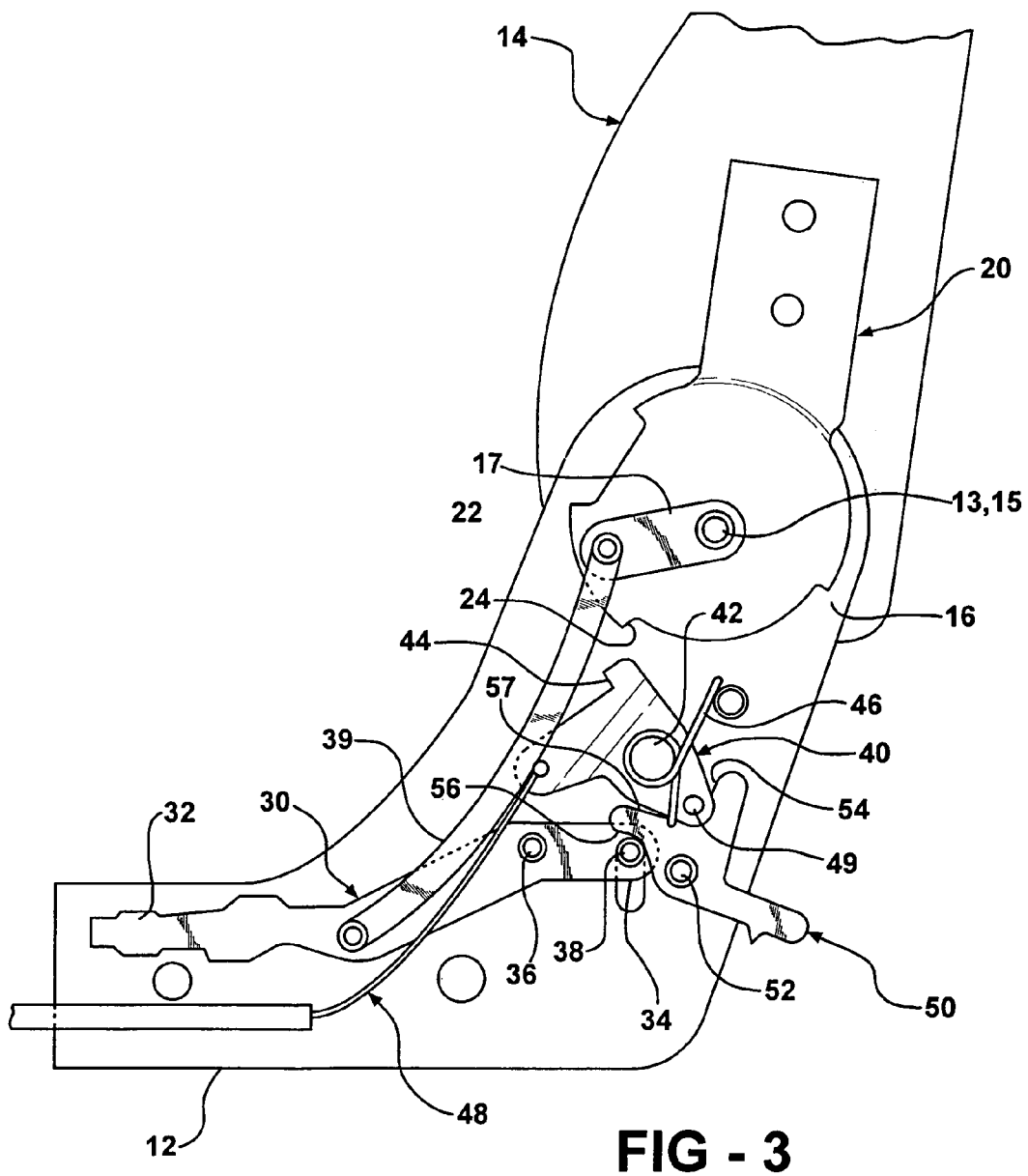
FIG. 3 is an enlarged side view of the seat assembly with the recliner assembly in the locked state.

Referring to FIG. 3, the seat back 14 includes a back frame 20 for supporting a cellular foam pad and trim cover, as conventionally known in the seating art. An arcuate flange 22 is formed in the back frame 20 and centered about the pivot axis 13. The flange 22 has an edge 24. The position of the edge 24 of the flange 22 about the pivot axis 13 generally defines the angular position of the tilt position G of the seat back 14, as shown in FIG. 2.

Figure 4:
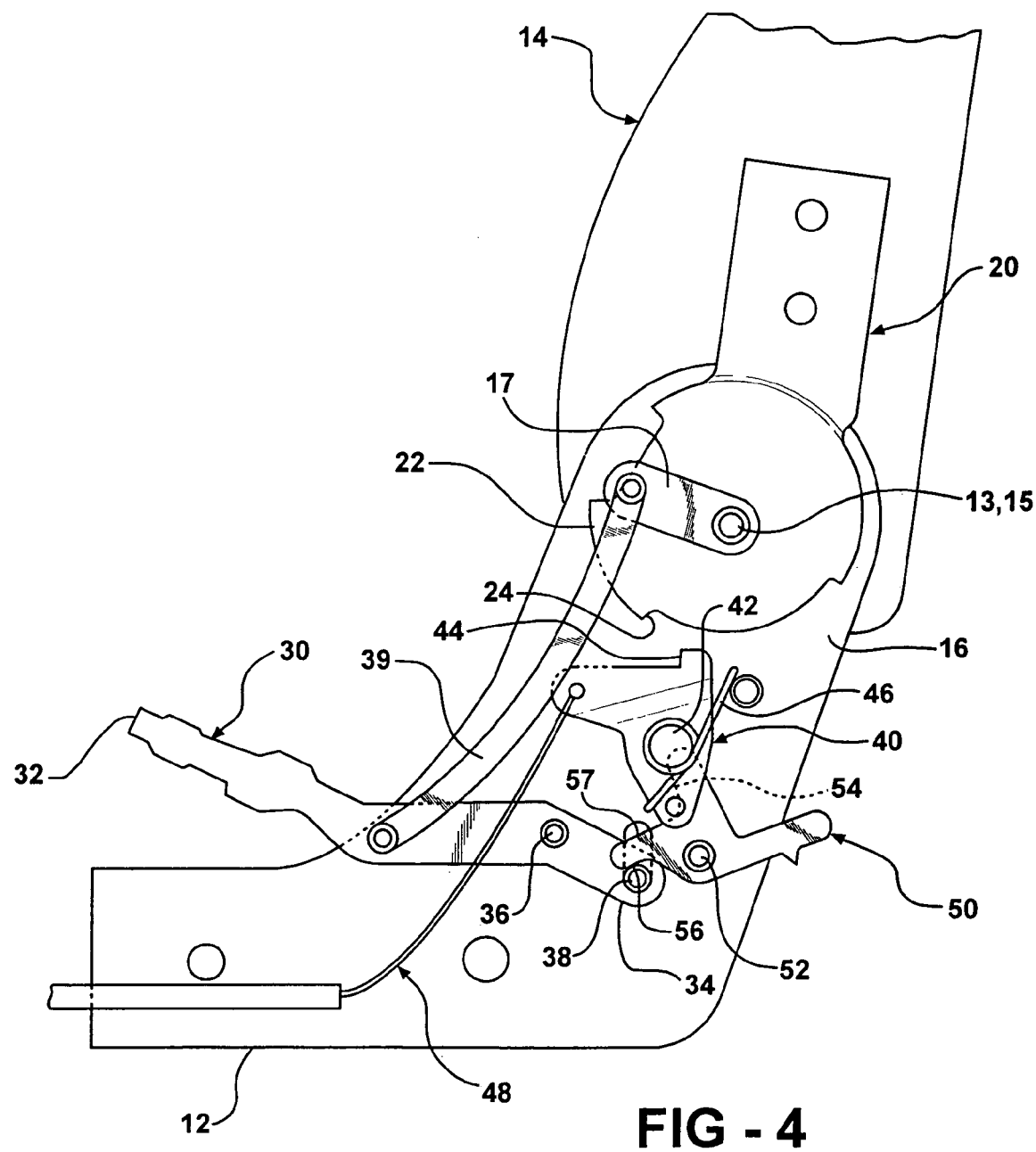
FIG. 4 is an enlarged side view of the seat assembly with the recliner assembly held in the unlocked state by the dump lever in the released position.

A shaft 15 extends axially from the recliner assembly 16. The shaft 15 is rotatably to the recliner assembly 16 for actuating the recliner assembly 16 between the locked and unlocked states. A lever arm 17 extends radially from the shaft 15. A release lever 30 extending between proximal and distal ends 32, 34 is pivotally mounted to the seat cushion 12 by a pivot pin 36 between the proximal and distal ends 32, 34. The release lever 30 is movable between an unreleased position, as shown in FIG. 3, and a released position, as shown in FIG. 4. A link 39 extends between one end pivotally coupled to the release lever 30 and an opposite end pivotally coupled to the lever arm 17 for actuating the recliner assembly 16 between the locked and unlocked states in response to pivotal movement of the release lever 30 between the unreleased and released positions. A pin 38 extends axially from the distal end 34 of the release lever 30.

A stop 40 is pivotally mounted to the seat cushion 12 by a pivot pin 42 for movement between a first position, as shown in FIG. 3, and a second position, as shown in FIG. 4. A hook 44 is formed in the stop 40 and is presented for engaging the edge 24 of the flange 22 when the stop 40 is in the second position. A biasing member 46 of any suitable type, such as a helical spring, extends between the seat cushion 12 and the stop 40 for biasing the stop 40 toward the first position. A cable 48, or other suitable link, extends between the stop 40 and the locking mechanism of the track assembly 18, shown in FIG. 1, so that rotation of the stop 40 between the first and second positions actuates the locking mechanism in the track assembly 18 between the locked and unlocked states, respectively. A pin 49, spaced apart from the pivot pin 42, extends axially outwardly from the stop 40.

A dump lever 50 is pivotally mounted to the seat cushion 12 by a pivot pin 52 and is movable between an unreleased position, as shown in FIG. 3, and a released position, as shown in FIG. 4. A first cam surface 54 is formed in the dump lever 50 for engaging the pin 49 on the stop 40. The first cam surface 54, acting upon the pin 49, actuates the stop 40 between the first and second positions when the dump lever 50 is rotated between the unreleased and released positions, respectively. A second cam surface 56 is formed in the dump lever 50 for engaging the pin 38 of the release lever 30. The second cam surface 56 acts upon the pin 38 during rotation of the dump lever 50 between the unreleased and released positions for rotating the release lever 30 between the respective unreleased and released positions. A third cam surface 57 is formed adjacent and generally normal to the second cam surface 56 for engaging the pin 49 when the stop 40 is in the second position.

In operation, the angular position of the seat back 14 relative to the seat cushion 12 may be adjusted between any one of the seating positions A, B, or C and the stowed position D by rotating the release lever 30 clockwise, as viewed from the perspective shown in FIGS. 2–4, to the released position. Clockwise motion of the release lever 30 is transferred through the link 39 to the lever arm 17, thereby actuating the recliner assembly 16 to the unlocked state. In the unlocked state, the seat back 14 is freely movable relative to the seat cushion 12. Once the seat back 14 has been adjusted to a desired position, the release lever 30 is allowed to return counterclockwise to the unreleased position as the recliner assembly 16 returns to the locked state. In the locked state, the angular position of the seat back 14 is locked relative to the seat cushion 12.

The seat assembly 10 may be adjusted between any one of the seating positions E to the easy entry position F by rotating the dump lever 50 counterclockwise, as viewed from the perspective shown in FIGS. 2–4, to the released position. The first cam surface 54, acting upon the pin 49, causes clockwise rotation of the stop 40 to the second position, wherein the hook 44 is presented for engaging the edge 24 of the flange 22 of the seat back 14. The second cam surface 56, acting upon the pin 38, causes rotation of the release lever 30 to the respective released position. Rotation of the release lever 30 is translated by the link 39 to the lever arm 17 and shaft 15 to move the recliner assembly 16 to the unlocked state. The biasing member 11 urges the seat back 14 to pivot clockwise towards the tilted position G. Once the seat back 14 reaches the tilted position G, the edge 24 of the flange 22 engages the hook 44. The hook 44 prevents further rotation of the seat back 14 and maintains the seat back 14 in the tilted position G against the force of the biasing member 11. In turn, the flange 22, while engaged with the hook 44, maintains the stop 40 in the second position. The stop 40, acting through the pin 49 upon the third cam surface 57 of the dump lever 50, maintains the dump lever 50 in the released position. The second cam surface 56 of the dump lever 50, acting upon the pin 38 of the release lever 30, maintains the release lever 30 in the released position. The cable 48 is actuated by the clockwise rotation of the stop 40, thereby releasing the locking mechanism in the track assembly 18. The seat assembly 10 is then freely adjustable to the easy entry position F with the seat back 14 remaining in the tilted position G. Positioning the seat assembly 10 in the easy entry position F with the seat back 14 in the tilted position G facilitates ingress or access behind the seat assembly 10.

The seat assembly 10 is returned to the full forward seating position E' by rotating the seat back 14 clockwise until reaching the upright seat position A. The hook 44 falls out of engagement with the edge 24 of the flange 22, thereby allowing the stop 40 to rotate back to the first position under the bias of the biasing member 46. The recline and dump levers 30, 50 return to their respective unreleased positions. The recliner assembly 16 returns to the locked state, which locks the seat back 14 in the upright seating position A. The seat assembly 10 may then be pushed rearwardly from the easy entry position F towards the full forward seating position E'. Once the seat assembly 10 reaches the full forward position E', the locking mechanism of the track assembly 18 re-locks and the seat assembly 10 is held in the full forward position E'.

Figure 5:
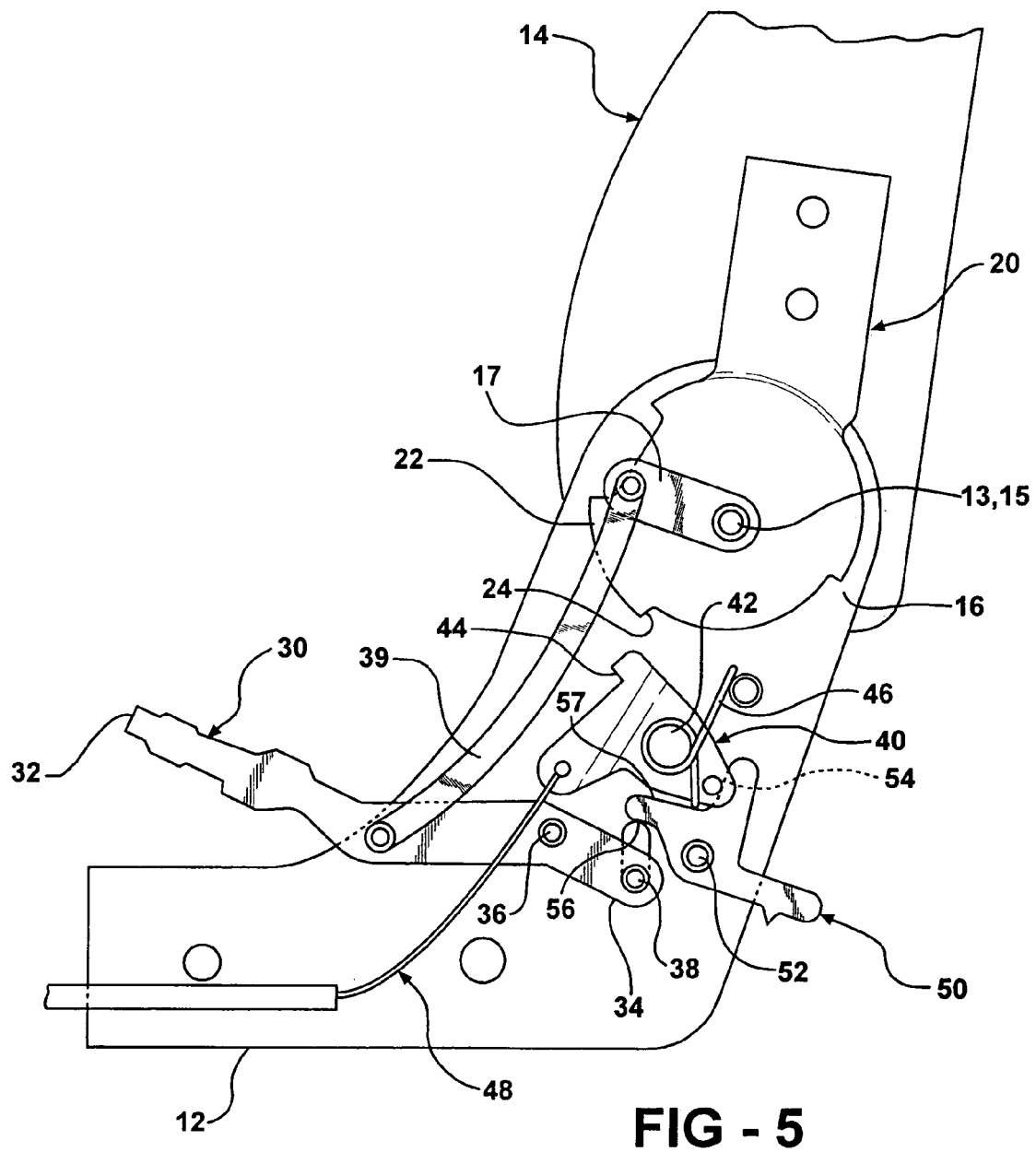
FIG. 5 is an enlarged side view of the seat assembly with the recliner assembly held in the unlocked state by the release lever in the released position.

Referring to FIG. 5, when the seat back 14 is in any one of the plurality of reclined seating positions A, B, or C and the seat assembly 10 is in any one of the seating positions E, the seat back 14 is adjusted to the stowed position D by rotating the release lever 30 clockwise, as viewed in FIGS. 2–4. The stop 40 remains in the first position and the dump lever 50 remains in the unreleased position. Clockwise motion of the release lever 30 is transferred through the link 39 to the lever arm 17, thereby actuating the recliner assembly 16 to the unlocked state. The seat back 14 pivots counterclockwise to the stowed position D under the bias of the biasing member 11. The seat back 14 is returned to the upright seating position A by rotating the seat back 14 clockwise against the bias of the biasing member 11. The recliner assembly 18 returns to the locked state when the seat back 14 reaches the upright seating position A.

The invention has been described in an illustrative manner, and it is to be understood that the terminology, which has been used, is intended to be in the nature of words of description rather than of limitation.

Many modification and variations of the present invention are possible in light of the above teachings. It is, therefore, to be understood that within the scope of the appended claims, the invention may be practiced other than as specifically described.

What is claimed is:

1. A seat assembly comprising:
   a seat cushion;
   a seat back;
   a recliner assembly operatively coupled between said seat cushion and said seat back for selective locking and providing pivotal adjustment of said seat back relative to said seat cushion between a plurality of reclined seating positions and a stowed position overlying the seat cushion;
   a release lever pivotally coupled to said seat assembly for movement between an unreleased position for locking said recliner assembly and a released position for unlocking said recliner assembly;
   a stop hookingly engagable with said seat back for maintaining said seat back in a tilted position pivoted between said plurality of reclined seating positions and said stowed position, said stop pivotally coupled to said seat assembly for movement between a first position wherein said seat back is fully movable between said seating and stowed positions and a second position presented for engagement with said seat back for maintaining said seat back in said tilted position, said stop including a hook formed therein and presented for engagement with said seat back for maintaining said seat back in said tilted position when said hook is in said second position and movable with said stop during movement between said first and second positions; and
   a dump lever cooperatively engaged with each of said release lever and said stop and pivotally coupled to said seat assembly for movement between unreleased and released positions for moving said release lever between said respective unreleased and released positions and simultaneously moving said stop between said first and second positions, thereby automatically releasing said recliner assembly to allow movement of said seat back to said tilted position defined by engagement with said stop, wherein said stop further includes a pin extending outwardly for camming engagement with said dump lever for moving said stop between said first and second positions in response to movement of said dump lever between said unreleased and released positions, respectively.

2. A seat assembly as set forth in claim 1 wherein said seat back includes a flange engagable with said hook for maintaining said seat back in said tilted position.

3. A seat assembly as set forth in claim 2 wherein said flange includes an edge formed therein engagable with said hook for maintaining said seat back in said tilted position.

4. A seat assembly as set forth in claim 3 wherein said release lever includes a pin extending outwardly for camming engagement with said dump lever for moving said release lever between said unreleased and released positions in response to movement of said dump lever between said respective unreleased and released positions.

5. A seat assembly as set forth in claim 4 wherein said dump lever includes a first cam surface engaged with said pin on said stop for moving said stop between said first and second positions in response to movement of said dump lever between said unreleased and released positions, respectively.

6. A seat assembly as set forth in claim 5 wherein said dump lever includes a second cam surface engaged with said pin on said release lever for moving said release lever between said unreleased and released positions in response to movement of said dump lever between said respective unreleased and released positions, respectively.

7. A seat assembly as set forth in claim 6 wherein said dump lever includes a third cam surface engagable with said pin on said stop for maintaining said dump lever in said released position when said stop is in said second position.

8. A seat assembly as set forth in claim 7 including a biasing member extending between said stop and said seat assembly for automatically biasing said stop toward said first position.

9. A seat assembly as set forth in claim 8 including an input shaft pivotally coupled to said recliner assembly for movement between locked and unlocked positions for locking and unlocking said recliner assembly, said input shaft operatively coupled to said release lever for moving between said locked and unlocked positions in response to movement of said release lever between said unreleased and released positions, respectively.

10. A seat assembly as set forth in claim 9 including a lever arm extending radially from said input shaft and operatively coupled to said release lever for moving said input shaft between said locked and unlocked positions in response to movement of said release lever between said unreleased and released positions, respectively.

11. A seat assembly as set forth in claim 10 including a link extending between one end pivotally coupled to said lever arm and an opposite end pivotally coupled to said release lever for moving said input shaft between said locked and unlocked positions in response to movement of said release lever between said unreleased and released positions, respectively.

12. A seat assembly as set forth in claim 11 including a biasing member for automatically biasing said seat back toward said stowed position.

13. A seat assembly as set forth in claim 12 having a track assembly operatively coupled between said seat assembly and the vehicle for selectively locking said seat assembly within the vehicle between a plurality of seating positions and an easy entry position forward of said plurality of seating positions to facilitate access behind the seat assembly.

14. A seat assembly as set forth in claim 13 including a link extending between said stop and said track assembly for locking and unlocking said track assembly during movement of said stop between said first and second positions, respectively, for selectively allowing movement of said seat assembly between said plurality of seating positions and said easy entry position while said seat back is held in said tilted position by said stop in said second position.

* * * * *